Patented Jan. 30, 1945

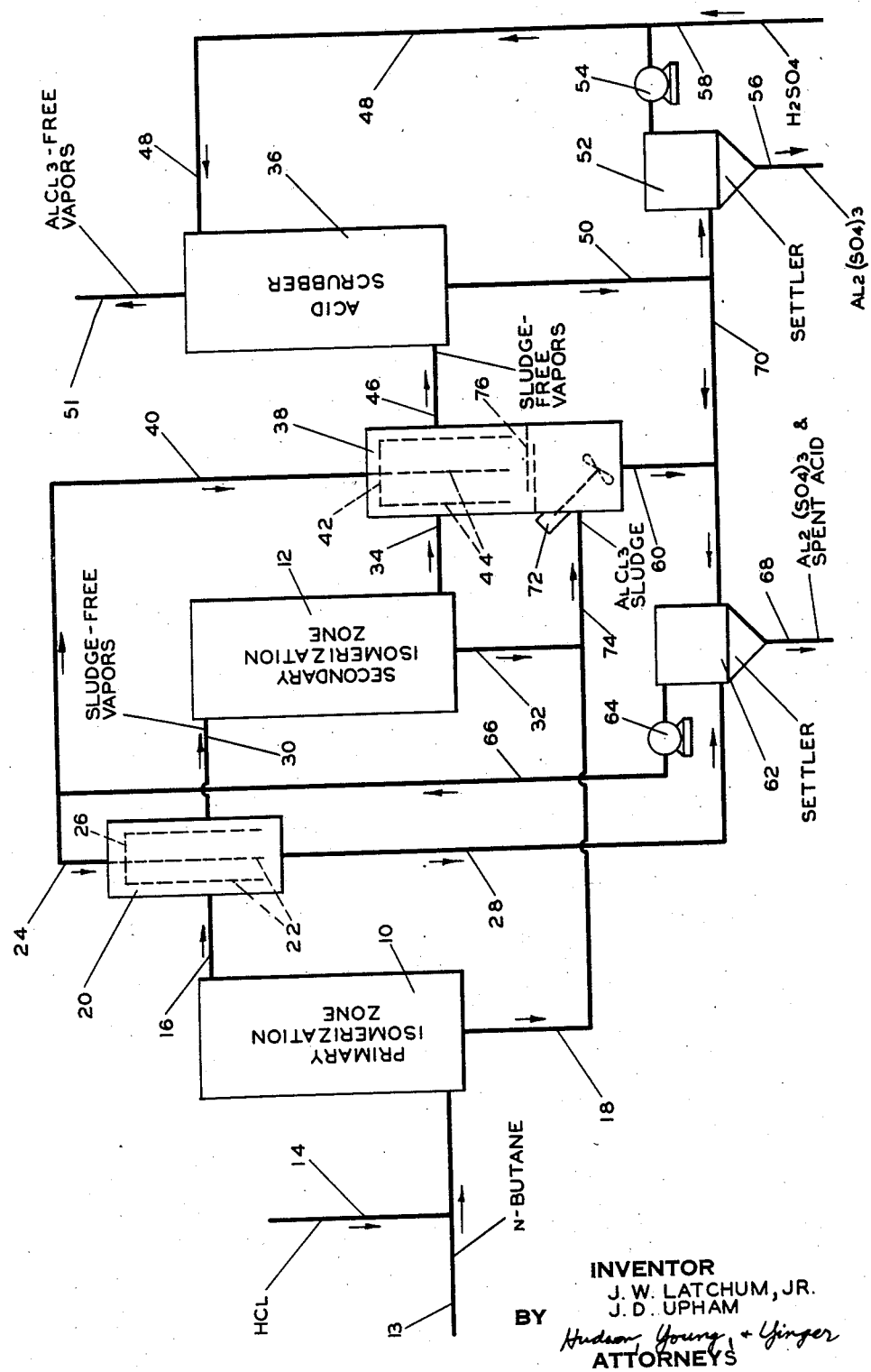

2,368,309

UNITED STATES PATENT OFFICE 2,368,309

REMOVAL OF METAL HALIDES FROM FLUIDS

John W. Latchum, Jr., and John D. Upham, Bartlesville, Okla., assignors to Phillips Petroleum Company, a corporation of Delaware Application January 3, 1944, Serial No. 516,884

14 Claims. (Cl. 260—683.5)

This invention relates to the removal of metal halides from fluids. A specific modification of the invention relates to purification of fluid reaction effluents from hydrocarbon conversions carried out in the presence of an anhydrous, normally solid or liquid, metal halide of the Friedel-Crafts type. This invention is particularly applicable to the vapor phase isomerization of normal butane to isobutane by means of an aluminum chloride catalyst and in the presence of anhydrous hydrogen chloride.

At the present time, hydrocarbon conversions effected with the aid of aluminum chloride or other Friedel-Crafts type metal halide catalysts are characterized by the difficulty that the catalyst permeates the entire system causing numerous troubles including corrosion, further reaction, clogging, etc. This is especially objectionable in those sections of the equipment which follow the conversion unit. Thus, where the effluent is removed in the vapor phase and, as is almost invariably the case where catalysts of the type described above are used, where the catalyst is readily volatilizable, the effluent contains substantial quantities of vaporized catalyst, and this catalyst in processes heretofore practiced deposits in the equipment after the converter. Vaporous effluents also ordinarily carry small but appreciable amounts of liquid metal halide sludge out of the reaction chambers by entrainment.

Numerous solutions to the problems presented in conversions of the type described have been proposed, but very few have found success in actual practice. A method which has been highly successful is the scrubbing of vaporous isomerization or other conversion effluents with sulfuric acid, which effects complete removal of vaporized aluminum chloride as well as any entrained sludge. Such a process is disclosed by John W. Latchum, Jr. in patent application Serial No. 460,858, filed October 5, 1942. In a somewhat similar manner phosphoric acid may be used as described in application Serial No. 460,859, filed October 5, 1942, by John W. Latchum, Jr. The present invention may be considered as an improvement over the processes of the Latchum applications just referred to.

In the use of sulfuric or phosphoric acid to scrub fluids having free aluminum chloride or other metal halide contained therein, gaseous hydrogen halide is formed and aluminum sulfate or other metal sulfate or phosphate is precipitated in the acid in the form of a finely divided solid. This solid is readily settled out and removed from the acid and represents, together with the hydrogen halide, substantially the only spending of the acid which occurs. However, when entrained aluminum chloride sludge is carried by the fluids into the acid scrubber, reaction occurs between the sludge and the acid to form hydrogen chloride and aluminum sulfate and also to form reaction products between the sulfuric acid and the organic constituents of the sludge. These latter reaction products are of a nature which is not fully understood at the present time; however, it is known that from hydrolysis of the acid, alcohols of relatively high molecular weight may be obtained. In addition, sulfonates and the like are believed to be formed to a substantial extent.

Such reaction of acid with sludge is highly desirable in that the sludge is not only removed from the conversion fluids, which is the primary function of the acid scrubbing, but also in that the inorganic and organic constituents thereof are also recovered in useable form. However, the acid is spent at a much more rapid rate by reaction with the sludge, than by the reaction with free volatilized aluminum chloride. Furthermore, the acid upon reaction with the sludge becomes very dark colored and it is contaminated with organic reaction products as mentioned above. These products, while largely soluble in the acid, have a somewhat undesirable diluting effect and at the relatively high temperatures frequently encountered seem to continue to react with further amounts of acid in addition to that used in the primary reaction. Insoluble oily residues are sometimes found which contain some free acid occluded therein. Separation of such a residue represents an additional loss of acid. The net result of sludge carry-over into an acid scrubbing system of the type described is the contamination and using up of acid which would otherwise remain in a relatively pure condition for longer periods of operation.

It is an object of our invention to remove Friedel-Crafts type metal halides from fluids, particularly from gaseous paraffin hydrocarbons.

Another object is to improve an acid scrubbing system of the type described, wherein a strong, relatively non-volatile mineral acid is used, so as to give longer acid life and cleaner acid for recirculation.

Another object is to remove aluminum chloride sludge from entrainment in gaseous butane isomerization effluents.

A still further object is to provide a two-stage process for purifying hydrocarbon conversion streams carrying volatilized and suspended metal halides and metal halide sludges.

Yet another object is to recover valuable components from metal halides and metal halide sludges.

A still further object is to provide a longer catalyst life for a supported aluminum chloride isomerization catalyst.

Further objects and advantages of the invention will be apparent, to one skilled in the art, from the accompanying disclosure and description.

Due to its importance, and for the sake of convenience, the invention will be described with particular reference to the isomerization of normal butane to produce isobutane in which the reaction mixture is passed in vapor state through primary and secondary catalyst chambers containing solid aluminum chloride catalysts. Application of the principles of the invention to other conversions may readily be made by suitable modifications by one skilled in the art. As a means of illustrating a preferred and specific embodiment of the invention, the accompanying drawing is provided, which shows in somewhat diagrammatic form one arrangement of apparatus and flow of materials therethrough, in which the process of the invention may be practiced. It will be appreciated that in view of the schematic nature of the drawing numerous items of auxiliary equipment such as heaters, contactors, pumps, valves, control equipment, fractionators, etc. have been omitted, for they may readily be supplied by one skilled in the art.

In the drawing, two reaction chambers 10 and 12 are provided. The primary reaction zone 10 contains lump aluminum chloride while the second zone contains a calcined low-iron-content bauxite, such as that sold under the trade name of "Porocel." Other solid adsorbent material such as activated charcoal, fuller's earth, silica gel, activated alumina, natural and artificial zeolites, various natural and synthetically prepared clay-like materials, etc. may be used in a manner known to the art. Normal butane, vaporized and heated (by means not shown) to a desired reaction temperature such as 195° F., enters the system through line 13 and is joined by a gaseous stream of hydrogen chloride activator introduced through line 14 in amounts which may, for example, correspond to from two to ten mol per cent of the total feed. The gaseous reaction mixture passes through isomerization zone 10 wherein a partial conversion to isobutane is effected. A limited amount of aluminum chloride becomes incorporated in the vapors by sublimation. The resulting gases leave zone 10 through line 16 for passage to the secondary isomerization zone 12. A liquid sludge containing aluminum chloride in combined and free state is formed in the primary chamber and largely drains to the bottom of the chamber, from which it is periodically or continuously withdrawn through line 18. Due to the high gas velocity through the bed of aluminum chloride in the primary chamber some sludge becomes entrained and passes out in the gases through line 16. Normally such sludge is carried over into the secondary chamber with deleterious results. The carry-over of liquid sludge into the adsorbent of the secondary chamber causes a contamination of the secondary catalyst with consequent necessity of a premature replacement thereof.

In accordance with this invention, the effluent vapors from primary zone 10 are passed through a sludge-removing unit 20 in which a substantial proportion, and preferably substantially all, of the sludge is removed by contact and reaction with limited amounts of a strong, relatively non-volatile mineral acid, such as sulfuric acid, an oxygen-containing acid of phosphorus, especially orthophosphoric acid, or the like. Unit 20 is constructed in such a manner that very little vaporized free aluminum chloride, generally less than 10 per cent and frequently less than one or two per cent of the free $AlCl_3$ vapor, is removed from the gases. One convenient construction adapted for this purpose is shown in the drawing in which a series of baffles 22 is provided. Over these baffles is caused to flow a relatively thin film of sulfuric acid introduced from line 24 by distributing means 26. The acid upon draining to the bottom of the chamber is removed through line 28. The gases carrying entrained sludge, upon meeting the baffles undergo sufficient change in direction and loss in velocity as to effect a ready contact of sludge and reaction thereof with the sulfuric acid. In this manner the sludge is substantially completely removed from the vapor stream while the other components of the vapor are substantially unaffected. Hydrogen chloride and butane vapors are substantially insoluble in sulfuric acid, while the vaporized $AlCl_3$ does not have much opportunity of contacting the acid in the method described. While the construction shown is a preferred manner of contacting the sludge-carrying fluid with limited amounts of acid, other methods may be used. For example, the baffles 22 may be of hollow perforated structure, with acid being forced from the hollow interior to the outside of the baffles. A spray of coarse droplets of acid may be used to pick up the sludge without effecting too intimate a contact of fluid with acid. Other methods will occur to those skilled in the art in view of the instant disclosure of principles to be followed.

The resulting sludge-free vapors pass from unit 20 through line 30 to secondary reactor 12. In this secondary zone the aluminum chloride vapors are largely adsorbed on the "Porocel" or other adsorbent from the gaseous mixture comprising normal butane, isobutane, and hydrogen chloride. The solid adsorbent with aluminum chloride thereon acts catalytically in the presence of the hydrogen chloride to further convert normal butane to isobutane. Small amounts of sludge are formed in reactor 12 and are removed from the bottom of the chamber through line 32 as required. Conversion products which may, for example, comprise from 30 to 60 per cent isobutane, exit through line 34 for passage to the acid scrubber 36 in which residual aluminum chloride vapors are to be removed. However, sludge is usually entrained in these vapors in small amounts and its introduction into the acid scrubber system 36 would be undesirable for the reasons hereinbefore mentioned. Accordingly, the effluent vapors are passed through a sludge removal unit 38 which may be constructed in a manner similar to unit 20. Sulfuric acid is supplied from line 40 through distributor 42 onto baffles 44. Any entrained sludge is removed in the manner described above with reference to unit 20, and sludge-free vapors pass through line 46 into scrubber 36. Scrubber 36 is preferably filled with Raschig rings or other material which will promote intimate liquid-vapor contact. Acid is supplied at or near the top through line 48 and is drawn from the bottom through line 50 after passing counter-currently to the vapors. The residual sublimed aluminum chloride is completely removed from the vapors with the production of hydrogen chloride and aluminum sulfate. The so-treated vapors are passed via line 51 to fractionation (not shown) in which hydrogen chloride is recovered for recycle to line 14, isobutane is recovered as a product, traces of pentane and heavier hydrocarbons are removed, and unconverted normal butane is recovered for recycle to line 13.

Returning to the acid scrubber system, the bulk of the acid withdrawn via line 50 from the bottom of scrubber 36 is passed to settler 52 in the bottom of which finely divided aluminum sulfate accumulates. Acid is withdrawn from settler 52 by pump 54 and returned via line 48 to the top of the scrubber. Aluminum sulfate is withdrawn from settler 52 through line 56 for any desired utilization. Make-up sulfuric acid is added to the system through line 58. Operation of this sulfuric acid scrubber system is more fully described in the aforementioned application Serial No. 460,858. Due to the substantially complete absence of sludge from the vapors passed into unit 36, the acid in this portion of the system remains of a clear color and is used up in amounts not substantially greater than that stoichiometrically equivalent to the aluminum chloride vapors entering scrubber 36. The scrubber, settler, pump, and lines associated therewith remain in a clean condition for an almost indefinitely long period of time.

Acid streams from sludge removal units 20 and 38 are passed via lines 28 and 60 respectively to a common settler 62. Separate settlers may be used if desired, but are not ordinarily necessary. Aluminum sulfate accumulates in the bottom of settler 62 and acid having a lowered solids content is withdrawn from the top of settler 62 by pump 64 and passed through line 66 for reintroduction into the sludge removal units. Ordinarily a relatively small flow of acid over the vertical plates in these units is adequate to remove the sludge from vapors in a commercial isomerization plant. A slurry of aluminum sulfate in acid is withdrawn from the bottom of settler 62 through line 68 to disposal or any desired utilization. The acid so withdrawn is of a dark brown or black color and may have small amounts of an insoluble oily material associated therewith. The system comprising the two sludge removal units 20 and 38 and the settler 62 together with associated pump and lines is much smaller than the acid scrubbing system used to treat the sludge-free vaporous effluent. The former system must be cleaned out more often than the latter due to its relatively large content of organic material, but this is much simpler than to clean out the larger system. Furthermore, the amount of acid in the sludge removal system is much smaller than that in the effluent scrubber system so that spending of acid by reaction with sludge contaminates and uses up a relatively small quantity of acid. Spent acid is withdrawn from settler 62 at a rate sufficient to maintain the strength of acid in the system at a desired value, for example, at a titratable acidity of at least 50 per cent. The spent acid so withdrawn may be subjected to hydrolysis for recovery of alcohols and other valuable materials. To replace thus-withdrawn spent acid it is necessary to introduce fresh acid into the system. However, absolutely fresh or unused acid is not required and it is most advantageous to withdraw a bleed acid stream from the effluent scrubbing system via line 70 and pass same into the sludge removal system as make-up acid. An economical utilization of the acid is thus attained, for a small amount of acid must be withdrawn from the scrubber system 36 in any event. Preferably, used, partially spent acid is so withdrawn from the main effluent scrubbing system comprising scrubber 36 and replaced with fresh acid at a rate sufficient to maintain the strength thereof above about 85 per cent $H_2SO_4$.

As an advantageous modification of the invention, the sludge withdrawn from the bottom of the reaction zones 10 and 12 is reacted with acid in conjunction with the sludge removal system. This may be done by passing such sludge to a separate contactor which is preferably supplied with sulfuric acid from settler 62 or any other suitable point in the sludge removal system. A simpler method is shown on the drawing in which the contacting zone referred to is provided as an integral part of sludge removal unit 38. A body of acid is maintained in a lower portion thereof, as shown, and an agitator 72 is provided. Sludge withdrawn from the reactors through lines 18 and 32 is passed via line 74 into the body of acid for reaction therewith. Horizontal baffle plates 76 are preferably provided slightly above the liquid level of the acid in order to minimize any carry-over of impure acid into the effluent scrubber unit 36. In this manner of operating, all the sludge formed in the process is effectively utilized to recover anhydrous hydrogen chloride therefrom, thus supplying make-up catalyst activator to the system. Organic components of the sludge are also recoverable in useful form from the spent acid. The treatment of metal halide sludges with a strong, relatively nonvolatile mineral acid, such as sulfuric or phosphoric acid, is disclosed and claimed in the copending application of John W. Latchum, Jr., Serial No. 516,318, filed December 30, 1943.

As a specific example of the practice of our invention the following data are presented. Inasmuch as these data are from one particular operation, namely vapor phase butane isomerization, carried out under specific conditions, it will be appreciated that the invention is of wider scope, and that this example is not to be construed as unduly limiting the invention. A process for the vapor-phase isomerization of normal butane produces 25,000 gallons per day of isobutane. A primary chamber 10 contains commercial aluminum chloride in lump form, which is replenished as required, and a secondary chamber 12 contains 125 tons of "Porocel." Fresh and recycle normal butane, containing from 2 to 6 mol per cent, usually about 5 mol per cent, HCl, enters the primary at 195° F. The system operates under a pressure of 180 pounds per square inch gage. Effluent from the primary, containing from 15 to 20 per cent isobutane, carries from 300 to 2000 lbs. per day aluminum chloride as vapors and as entrained sludge. The sludge comes over in slugs, and this accounts for the large variation in amount. The primary effluent vapors are next passed through a chamber constructed in a manner similar to unit 20 in the drawing for the removal of sludge. This chamber is 4' x 4' x 6' in size, and contains two vertical baffle plates. Over these plates is pumped 2000 pounds per day of sulfuric acid. The thus-treated vapors, after passing through a small packed tower which prevents any possible carry-over of sulfuric acid, pass through the secondary chamber and exit therefrom at a temperature of 250° F. and with an isobutane content of from 45 to 55 per cent. These effluent vapors next pass through a second sludge-removing chamber of construction identical to that of the first. Sulfuric acid is pumped over the plates in the second chamber at a rate of 3000 pounds per day.

The sludge-free vapors are next passed directly into the main acid scrubber for the complete removal of vaporized aluminum chloride. This scrubber, corresponding to unit 36 of the drawing, is a tower 4' in diameter and 15' high, and is packed to a depth of 6' with 1" Berl saddles made of stoneware. A pool of sulfuric acid is maintained below the packing into which the isomerization effluents are passed, and acid is circulated from this pool to the top of the packing at a rate of 26 gallons per minute. The effluent from the acid scrubber, which is absolutely free of AlCl₃ in any form, is condensed and passed to the HCl fractionator for recovery of recycle HCl. The bottoms from this fractionator are caustic washed and then passed to the deisobutanizer column for recovery of product isobutane and recycle normal butane.

Acid is withdrawn from the main scrubber for use as make-up to the sludge removal scrubbers. Acid from the latter is passed to a separate batch contactor into which is introduced, on the average, about 500 pounds per day of sludge withdrawn from the bottom of the primary and secondary chambers. This contactor is held at about 140 pounds per square inch gage, and is operated at 150° F. HCl is produced at the rate of 220 pounds per day and is pressured from the contactor into the HCl fractionator feed tank as needed. Of course additional make-up HCl is continuously added to the system by reaction of sludge and vaporized AlCl₃ in the three acid contactors through which the vapor stream passes.

The principal acid scrubber remains in an exceptionally clean condition, and the acid therein is only slightly darkened in color. The rate of withdrawal of acid from this system to the sludge removal system, and from the sludge removal system to the batch sludge contactor, is more than adequate to maintain a high acid concentration in and to give satisfactory functioning of the vapor-treating units. The over-all acid consumption is also substantially reduced compared to the acid consumption in a similar system not employing the sludge removal units.

We claim:

1. A process for isomerizing normal butane to isobutane which comprises passing a gaseous stream comprising normal butane and a catalyst-activating amount of hydrogen chloride through a first zone containing an aluminum chloride isomerization catalyst, removing therefrom a gaseous stream containing volatilized aluminum chloride and also containing liquid aluminum chloride sludge entrained therein, contacting said stream with a limited amount of a strong, relatively non-volatile mineral acid under conditions effecting removal of a substantial proportion of said entrained sludge by contact and reaction with said acid without removing volatilized aluminum chloride to more than a minor extent, passing the so-treated stream at isomerization conditions through a second zone containing an isomerization catalyst comprising aluminum chloride adsorbed on a solid adsorbent material, removing therefrom a gaseous stream containing volatilized aluminum chloride and also containing liquid aluminum chloride sludge entrained therein, contacting said stream with a limited amount of a strong, relatively non-volatile mineral acid under conditions effecting removal of a substantial proportion of said entrained sludge by contact and reaction with said acid without removing volatilized aluminum chloride to more than a minor extent, passing the so-treated stream into contact with sufficient strong, relatively non-volatile mineral acid to substantially remove said volatilized aluminum chloride therefrom, and recovering isobutane product from the so-treated stream.

2. The process of claim 1, in which said strong, relatively non-volatile mineral acid used in each of said acid-contacting steps is sulfuric acid.

3. The process of claim 1, in which said strong, relatively non-volatile mineral acid used in each of said acid-contacting steps is phosphoric acid.

4. The process of claim 1, in which acid from each of said first two acid-contacting steps is passed to a common settling zone, an insoluble aluminum salt is removed from the acid by settling therein, and acid is returned from said settling zone to said first two acid-contacting steps.

5. The process of claim 1, in which acid from each of said first two acid-contacting steps is used to react with additional aluminum chloride sludge removed from said first and second zones, and hydrogen chloride formed by said reaction is introduced into the isomerization system as catalyst activator.

6. In a process in which a reaction effluent is obtained from a hydrocarbon conversion catalyzed by a metal halide catalyst of the Friedel-Crafts type, which effluent contains a substantial amount of said catalyst in sludge form and also in the free state in non-sludge form, and in which said effluent is treated with a strong, relatively non-volatile mineral acid to effect removal of said catalyst therefrom, the improvement which comprises contacting said effluent in a first step with a first portion of said acid in limited amount under conditions effecting removal of a substantially higher percentage of the total sludge present in said effluent than of the total catalyst in non-sludge form present in said effluent, and then contacting said effluent in a second step with a second and different portion of said acid in an amount and under conditions adequate to effect substantial removal of remaining catalyst.

7. The process of claim 6, in which used, partially spent acid is removed from said second portion of acid and introduced as make-up into said first portion of acid.

8. In the vapor phase conversion of low-boiling paraffin hydrocarbons in the presence of a Friedel-Crafts type metal halide catalyst, in which vaporous conversion effluents containing vaporized metal halide catalyst and also entrained liquid metal halide-hydrocarbon sludge are contacted with sulfuric acid to substantially completely remove catalyst therefrom, the improved method of operating with comprises contacting said vaporous effluents with a limited amount of sulfuric acid under conditions effecting substantially complete removal of sludge therefrom but incomplete removal of vaporized catalyst, and then contacting resulting sludge-free effluents with a body of sulfuric acid to effect substantially complete removal of remaining metal halide catalyst therefrom, acid being used in said latter body of sulfuric acid being maintained separate from acid being used in said sludge-removal step, thereby avoiding contamination of said body of acid with organic constituents of said sludge.

9. In the process of claim 8, withdrawing acid from said body of acid and supplying fresh acid thereto at a rate sufficient to maintain the strength thereof above about 85 per cent $H_2SO_4$, and passing acid so withdrawn to said sludge removal step to replace acid removed by reaction with said sludge.

10. In the isomerization of normal butane to isobutane wherein a normal butane-containing gas is passed at elevated temperature in contact with solid aluminum chloride to pick up sublimed aluminum chloride, and then passed at isomerization conditions of temperature and pressure in contact with a solid adsorbent material which is maintained active as an isomerization catalyst by adsorption of said sublimed aluminum chloride from said gas, and wherein an aluminum chloride sludge is entrained in said gas upon contact of said gas with said solid aluminum chloride and is carried into contact with said solid adsorbent with deleterious effect, the method of protecting said solid adsorbent from contamination with said sludge which comprises contacting said gas, at a point intermediate its contact with said solid aluminum chloride and its contact with said solid adsorbent, with a limited amount of sulfuric acid under conditions effecting substantially complete removal of said entrained sludge while avoiding removal of more than about 10 per cent of said sublimed aluminum chloride.

11. The process of claim 6, in which said strong, relatively non-volatile mineral acid is sulfuric acid.

12. The process of claim 6, in which said strong, relatively non-volatile mineral acid is an oxygen-containing acid of phosphorus.

13. The process of claim 6, in which said strong, relatively non-volatile mineral acid is orthophosphoric acid.

14. The process of claim 6, in which metal halide sludge in addition to that contained in and removed from said effluent as described is obtained from said conversion, is reacted with used, partially spent acid from at least one of said acid-contacting steps, and hydrogen halide so formed by said reaction is introduced into the conversion as catalyst activator.

JOHN W. LATCHUM, Jr.
JOHN D. UPHAM.